United States Patent
Wolf et al.

(10) Patent No.: US 7,989,996 B2
(45) Date of Patent: Aug. 2, 2011

(54) FIVE-PHASE GENERATOR

(75) Inventors: Gert Wolf, Affalterbach (DE); Norbert Pfitzke, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 11/573,925

(22) PCT Filed: May 22, 2006

(86) PCT No.: PCT/EP2006/062505
§ 371 (c)(1),
(2), (4) Date: Feb. 19, 2007

(87) PCT Pub. No.: WO2006/122985
PCT Pub. Date: Nov. 23, 2006

(65) Prior Publication Data
US 2007/0296289 A1 Dec. 27, 2007

(30) Foreign Application Priority Data
May 20, 2005 (DE) .................. 10 2005 023 363

(51) Int. Cl.
*H02K 19/16* (2006.01)
(52) U.S. Cl. ............... 310/68 D; 310/216.112; 310/263
(58) Field of Classification Search ........... 310/68 D, 310/216.074, 216.112, 156.66, 156.71, 156.73, 310/263
See application file for complete search history.

(56) References Cited

U.S. PATENT DOCUMENTS

| | | | | |
|---|---|---|---|---|
| 2,414,571 A * | 1/1947 | Veinott | ................... | 310/198 |
| 3,479,543 A * | 11/1969 | Drexler | .................... | 310/162 |
| 3,538,362 A * | 11/1970 | Cheetham et al. | .......... | 310/68 D |
| 3,667,011 A * | 5/1972 | Casaday et al. | ............ | 318/400.4 |
| 4,127,787 A * | 11/1978 | Auinger | .................... | 310/184 |
| 4,358,692 A * | 11/1982 | Hallerback | ................ | 310/42 |
| 4,751,448 A * | 6/1988 | Auinger | .................... | 318/773 |
| 4,912,379 A * | 3/1990 | Matsuda et al. | ......... | 318/400.23 |
| 5,334,898 A * | 8/1994 | Skybyk | ..................... | 310/268 |
| 5,783,891 A * | 7/1998 | Auinger et al. | ............. | 310/180 |
| 6,204,586 B1 * | 3/2001 | Umeda et al. | ............... | 310/179 |
| 6,271,608 B1 * | 8/2001 | Haydock et al. | ............. | 310/71 |
| 6,275,404 B1 * | 8/2001 | Shichijyo et al. | ........... | 363/145 |
| 6,417,592 B2 * | 7/2002 | Nakamura et al. | ........... | 310/184 |
| 6,515,397 B1 * | 2/2003 | Schmid | ..................... | 310/418 |
| 6,570,289 B1 * | 5/2003 | Liang et al. | .................. | 310/179 |
| 7,268,537 B2 * | 9/2007 | Nakano et al. | ........... | 324/207.25 |
| 2001/0040416 A1 * | 11/2001 | Nakamura et al. | ........... | 310/201 |
| 2001/0043018 A1 * | 11/2001 | Haydock et al. | ............. | 310/71 |
| 2003/0107287 A1 * | 6/2003 | Nishimura et al. | .......... | 310/180 |
| 2003/0132680 A1 | 7/2003 | Nakamura et al. | | |
| 2004/0150284 A1 * | 8/2004 | Umeda | ..................... | 310/179 |
| 2004/0263016 A1 * | 12/2004 | Neet | ......................... | 310/208 |
| 2005/0006973 A1 | 1/2005 | Bradfirld et al. | | |
| 2005/0093521 A1 * | 5/2005 | Nishimura et al. | ............ | 322/32 |

FOREIGN PATENT DOCUMENTS

DE   33 45 272   7/1985
(Continued)

*Primary Examiner* — Burton Mullins
*Assistant Examiner* — Naishadh N Desai
(74) *Attorney, Agent, or Firm* — Michael J. Striker

(57) ABSTRACT

The invention relates to a five-phase electric generator (1), in particular for a motor vehicle, said generator comprising five electric branches (12) for five different phases, the latter being electrically connected at interconnection points (14). The electric angle ($\alpha$) ranges between 25° and 36° at said interconnection points (14).

32 Claims, 6 Drawing Sheets

FOREIGN PATENT DOCUMENTS

| | | |
|---|---|---|
| DE | 10 2004 032 683 | 3/2005 |
| EP | 1 296 439 | 3/2003 |
| JP | 2002-199683 | 7/2002 |
| JP | 2004-215471 | 7/2004 |
| WO | 2005/034308 | 4/2005 |

* cited by examiner

FIVE-PHASE GENERATOR

BACKGROUND OF THE INVENTION

The present invention relates to a five-phase electrical generator, in particular for a motor vehicle, with five electrical phase windings for five different phases, with phases being electrically connected at interconnection points.

RELATED ART

Electrical generators are known from the related art. Efforts have been focussed on developing single-phase, three-phase, and six-phase generators. Six-phase generators are used in particular where improved magnetic noise behavior and a lower voltage ripple are required as compared with single-phase and three-phase generators. Six-phase generators are much more expensive to manufacture, however. In addition, five-phase generators are known that are less impressive than six-phase generators specifically in terms of magnetic noise behavior. There is a need, therefore, for a generator with a magnetic noise behavior that is equivalent to that of a six-phase generator but that is easier and less expensive to manufacture.

SUMMARY OF THE INVENTION

With a five-phase generator according to the present invention, it is provided that the electrical angle at the interconnection points is between 25° and 36°. This results in a marked reduction in the magnetic noise behavior compared to that of three-phase generators; in particular, the magnetic noise behavior is nearly the same as or identical to that of a six-phase generator. In addition, the design is simplified in many regards. In one control circuit of the inventive generator, for example, two diodes can be eliminated as compared with a six-phase generator. A simpler interconnection is also provided, since only five phases with ten connections are needed, instead of six phases with twelve connections. Overall, a generator with increased robustness is attained. One reason for this is the fact that fewer slots are required. With eight pole pairs, for example, only 80 slots are required, instead of 96. As a result, the percentage of insulation in the slot decreases while the insulation thickness remains the same. A more stable design also results, since the tooth width is greater as compared with that of a six-phase generator. Finally, higher copper factors can be attained with the inventive generator. Possibilities for attaining the desired electrical angles will be explained below. It should be noted that the ranges stated in this document are inclusive, i.e., the endpoints are included.

The electrical angle is between 31° and 36°, in particular between 34° and 36°, and preferably approximately 36°. While the magnetic noise behavior is improved compared with three-phase generators, even with smaller electrical angles, it was also observed that the measurement results improved for the electrical angles stated above. Based on the applicant's findings, minimal noise occurs at approximately 36° or as close to exactly 36° as possible, although the advantages of the present invention also exist when the angles are smaller.

According to a preferred embodiment, an interconnection of stator outgoing wires is realized on a winding overhang of the generator. Manufacture can be simplified further as a result, since there are only five connections—not ten—on the stator of the generator.

It is also preferable that the generator is connected to a rectifier, particularly a B10 rectifier. The expression "B10" refers to a bridge rectifier with ten half-bridges (i.e., five bridge branches). A rectifier of this type is particularly suited for use with the proposed generator.

The interconnection of stator outgoing wires is advantageously realized within a wiring plate that is assigned to a rectifier. This also allows manufacture to be simplified further, since only five connections—not ten—are now required on the stator of the generator.

With a refinement of the present invention, a stator winding of the generator is composed of one continual conductor per phase, particularly a single wire. Manufacturing costs are reduced as a result, since it is more cost-favorable to process one continual conductor than to use plug-in windings.

It is particularly advantageous when a copper factor of a stator of the generator is greater than or equal to 50%. The "copper factor" refers to the conductor factor of the stator slots, i.e., the ratio of the sum of all copper cross sections of the conductors located in a slot to the total cross section of the slot. If a copper factor greater than or equal to 50% is selected, a particularly good efficiency of the generator is attained.

Advantageously, in one configuration of the generator, in particular according to FIG. 1, below, for a voltage level of 14V, five to eleven electrical conductors—eight conductors in particular—are inserted into each slot of a stator of the generator. In terms of the number of conductors, the configuration always aims to also attain high power output in the low speed range (higher number of conductors) and high power output in the high speed range (lower number of conductors). A great deal of expense is always required to optimize the number of conductors. The applicant recognized that the range proposed for the number of conductors is advantageous.

It is also advantageous when, in one configuration of the generator, in particular according to FIG. 1, below, for a voltage level of 28V, ten to 18 electrical conductors are inserted into each slot of a stator of the generator.

According to a refinement of the present invention, in one configuration of the generator, in particular according to FIG. 1, below, for a voltage level of 42V, 19 to 30 electrical conductors are inserted into each slot of a stator of the generator.

With a further embodiment of the present invention, sub-phase windings of phase windings are also interconnected at connection points. This can be advantageous for the characteristics of the generator and/or for the design of the generator.

A stator winding of the generator advantageously includes a chording. The term "chording" means that sub-phase windings—at least—of the generator are inserted into at least some other slots, as compared with a conventional stator winding, i.e., they are inserted into the slots located directly adjacent, or into the next slot after that. With regard for the general aspects of a chording of this type, reference is hereby made explicitly to publications DE 103 47 486 and WO 2005/034308 as part of the subject matter of the disclosure of this application. For the five-phase generator provided, "chording" means that, e.g., the coil span, which is typically from slot 1 to slot 2, is now replaced at least once within a total phase winding by a different coil span, e.g., to slot 5 or slot 7 instead of slot 6. The magnetic noise behavior is improved as a result.

Each of the phase windings of the generator preferably includes at least two sub-phase windings, which are connected with each other at the interconnection points, and the sub-phase windings are wound individually and are interconnected at a winding overhang or on a wiring plate. The manufacture of the generator is simplified as a result.

It is also advantageous when one half of each phase winding is placed into one of two adjacent slots of a stator of the generator. The distribution is therefore approximately 50%.

According to an advantageous refinement of the present invention, a total interconnection of the generator is a star pattern.

Advantageously, in one configuration of the generator, in particular according to FIG. 2, below, for a voltage level of 14V, two to five electrical conductors—four conductors in particular—are inserted into each slot of a stator of the generator. The applicant recognized that the range proposed for the number of conductors is advantageous.

It is also advantageous when, in one configuration of the generator, in particular according to FIG. 2, below, for a voltage level of 28V, five to nine electrical conductors are inserted into each slot of a stator of the generator.

According to a refinement of the present invention, in one configuration of the generator, in particular according to FIG. 2, below, for a voltage level of 42V, ten to 15 electrical conductors are inserted into each slot of a stator of the generator.

The advantages of the exemplary embodiments described, namely high power density and noise reduction, are attainable particularly preferably using a generator with a rotor that is a claw-pole rotor.

The fact that there are more slots as compared with three-phase generators, with the same number of pole pairs, has proven particularly advantageous, since this results in a larger cooling surface in winding overhang 45, around which air also advantageously flows in the radial direction.

BRIEF DESCRIPTION OF THE DRAWINGS

The present invention will now be explained in greater detail with reference to several exemplary embodiments.

DETAILED DESCRIPTION OF THE EXEMPLARY EMBODIMENTS

Figure 1:
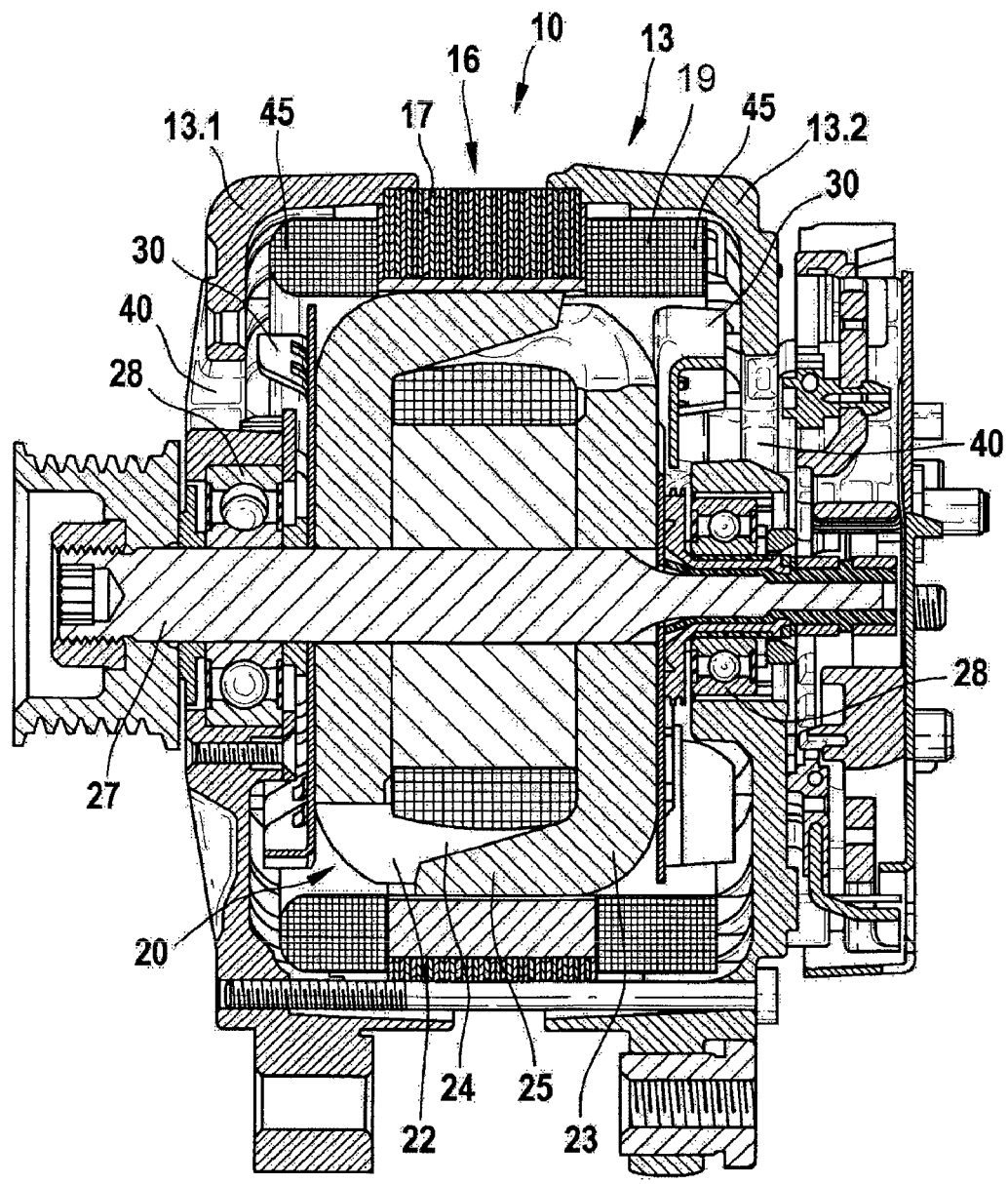
FIG. 1 shows a longitudinal sectional view of an electrical machine designed as an alternator.

FIG. 1 is a longitudinal sectional view through an electrical machine 10, which is designed in this case as a generator or an alternator for motor vehicles. Electrical machine 10 includes a two-piece housing 13, which is composed of a first end shield 13.1 and a second end shield 13.2. End shield 13.1 and end shield 13.2 enclose a stator 16, which is composed of an essentially annular stator core 17; a stator winding 19 is inserted into the slots of stator core 17, which point radially inwardly and extend in the axial direction. Annular stator 16 surrounds—via its radially inwardly oriented, slotted surface—a rotor 20, which is designed as a claw-pole rotor. Rotor 20 is composed of two claw-pole plates 22 and 23, on the outer circumference of which axially extending claw-pole fingers 24 and 25 are located. Claw-pole plates 22 and 23 are located in rotor 20 such that their axially extending claw-pole fingers 24 and 25 alternate with each other around the circumference of rotor 20. This results in intermediate spaces—which are required for the magnetic fields—between claw-pole fingers 24 and 25, which are magnetized in opposite directions. These intermediate spaces are referred to as claw-pole intermediate spaces. Rotor 20 is rotatably supported in respective end shields 13.1 and 13.2 via a shaft 27 and a roller bearing 28 located on each side of the rotor.

Rotor 20 has two axial end faces, on each of which a fan 30 is mounted. Fan 30 is composed essentially of a plate-shaped section and a disk-shaped section, out of which fan blades extend in a known manner. Fans 30 serve to make air exchange possible—via openings 40 in end shields 13.1 and 13.2—between the outside of electrical machine 10 and the interior of electrical machine 10. To this end, openings 40 are provided essentially on the axial ends of end shields 13.1 and 13.2, via which cooling air is drawn into the interior of electrical machine 10 by fan 30. This cooling air is accelerated radially outwardly via the rotation of fans 30, so that it can pass through the winding head or winding overhang 45, which is permeable to cooling air. Winding overhang 45 is cooled via this effect. After the cooling air passes through winding overhang 45 or flows around winding overhang 45—through openings that are not shown in FIG. 1—it travels radially outwardly. Winding overhangs 45 are cooled by a radial cooling air flow.

Figure 2:
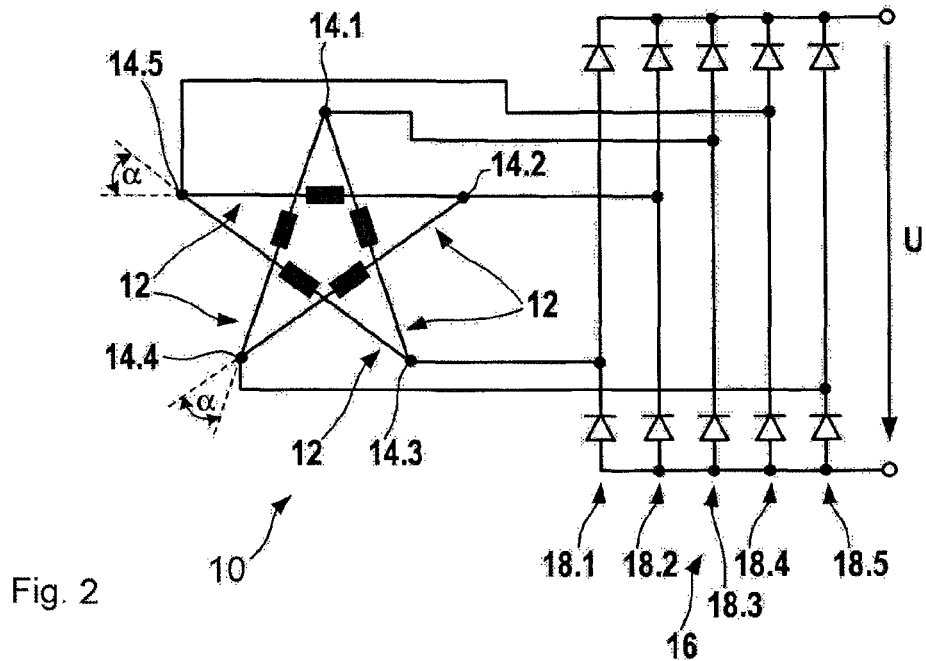
FIG. 2 shows a five-phase generator according to a first exemplary embodiment.

FIG. 2 shows a five-phase generator 10 according to a first exemplary embodiment. Since the electrical circuit of generator 10 is the main focus, generator 10 is depicted here via its circuit diagram. It should be noted that the orientation of the five phase windings 12 located in slots of stator 16 each represent the electrical angle of phase windings 12 relative to each other, particularly electrical angle a, which occurs at interconnection points 14 (14.1 through 14.5). Generator 10 is connected to a voltage source U and a (B10) rectifier 16 with five bridge branches 18 (18.1 through 18.5). "B10" means this is a bridge rectifier with two rectifier diodes per bridge, with five bridges connected in parallel. This results in ten diodes in the bridge rectifier. Specifically, interconnection points 14 and bridge branches 18 are assigned to each other as follows: 14.1 to 18.3,14.2 to 18.2, 14.3 to 18.1,14.4 to 18.5 and 14.5 to 18.4. Electrical angle a between two phase windings 12 at one interconnection point 14 is 36° in each case. A smaller angle a can also be selected, as was explained in detail above in this application.

The electrically active winding path of stator winding 19 and, therefore, of the five phase windings 12, is closed after two electrically active convolutions in accordance with the linkages of the phase windings 12, see FIG. 2.

A generator 10 according to FIG. 2 is suited for high output in particular.

Figure 3:
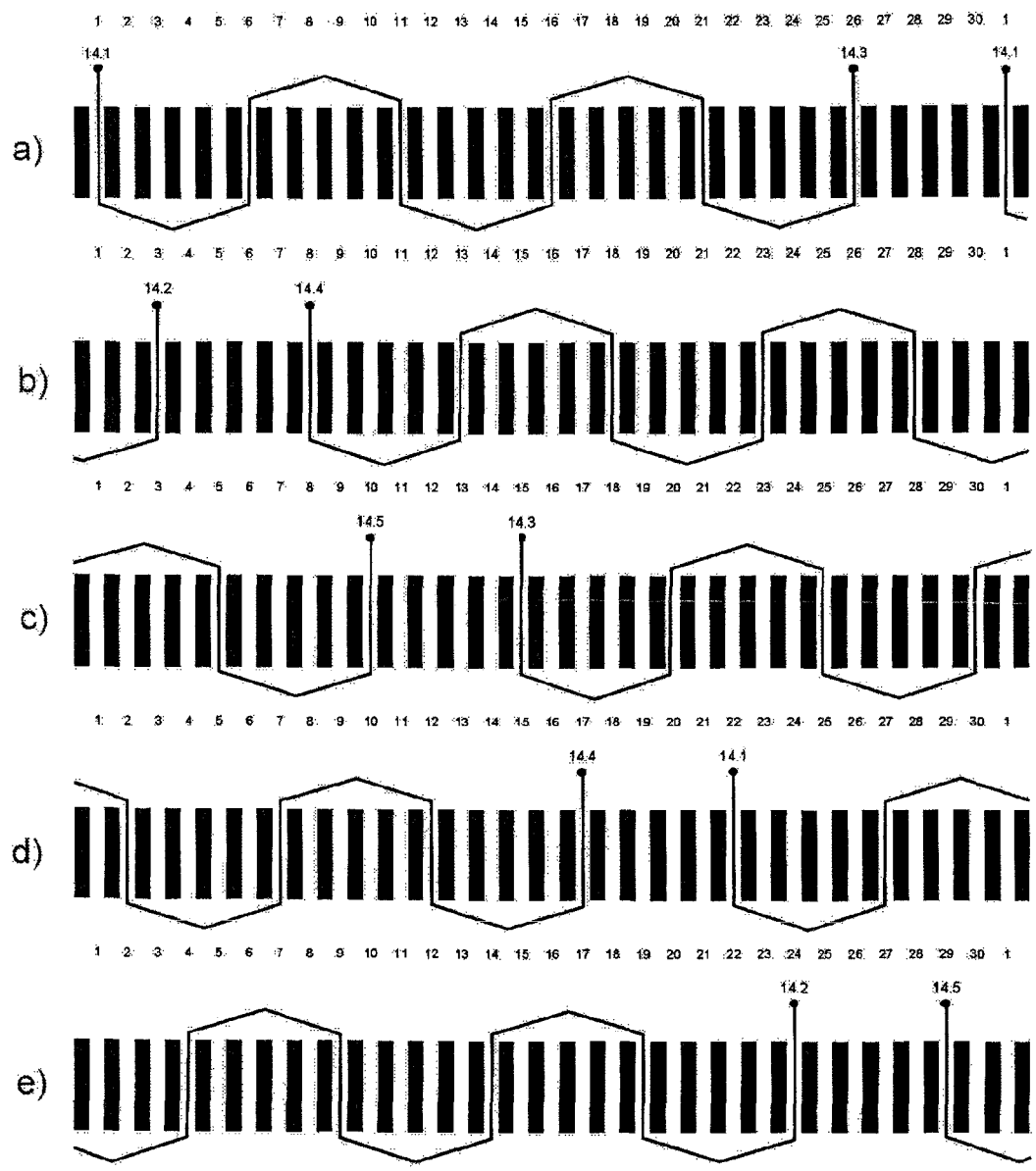
FIG. 3 shows a depiction of the phase wires and their positions in the slots according to the first exemplary embodiment.

FIG. 3 shows a depiction of the phase windings and their positions in the slots according to the first exemplary embodiment. Since this is the depiction of stator 16 of a five-phase generator 10, the coil span is five slots. The wire of first phase winding 12 extends from interconnection point 14.1 into first slot 1 and, from there, into the next slot, which is slot 6. See also FIG. 3a. The next slot to be occupied, therefore, is slot 11, which is followed via a certain scheme or coil span by slot 16, slot 21 and, finally, slot 26. After slot 26, the wire terminates at interconnection point 14.3.

The wire of second phase winding 12 takes a similar course. See FIG. 3b. The wire of second phase winding 12 extends from interconnection point 14.4 into first slot 8 and, from there, into the next slot, which is slot 13. The next slot to be occupied, therefore, is slot 18, which is followed via a certain scheme or coil span by slot 23, slot 28 and, finally, slot 3. After slot 3, the wire terminates at interconnection point 14.2.

The wire of third phase winding 12 takes a similar course. See FIG. 3c. The wire of second phase winding 12 extends from interconnection point 14.4 into first slot 15 and, from there, into the next slot, which is slot 20. The next slot to be occupied, therefore, is slot 25, which is followed via a certain scheme or coil span by slot 30, slot 5 and, finally, slot 10. After slot 10, the wire terminates at interconnection point 14.5.

The wire of fourth phase winding 12 takes a similar course. See FIG. 3d. The wire of third phase winding 12 extends from interconnection point 14.1 into first slot 22 and, from there, into the next slot, which is slot 27. The next slot to be occupied, therefore, is slot 2, which is followed via a certain scheme or coil span by slot 7, slot 12 and, finally, slot 17. After slot 17, the wire terminates at interconnection point 14.4.

The wire of fifth phase winding 12 takes a similar course. See FIG. 3e. The wire of fifth phase winding 12 extends from interconnection point 14.5 into first slot 29 and, from there, into the next slot, which is slot 4. The next slot to be occupied, therefore, is slot 9, which is followed via a certain scheme or coil span by slot 14, slot 19 and, finally, slot 24. After slot 24, the wire terminates at interconnection point 14.2.

For the case in which stator 16 includes more than thirty slots, that is, e.g., forty or fifty or more, that many more turns must be carried out.

Figure 4:
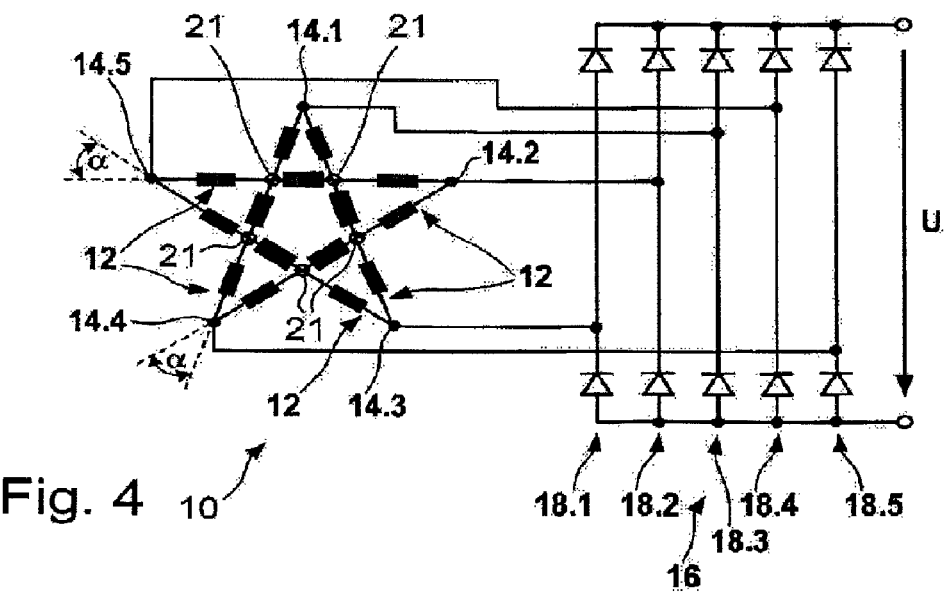
FIG. 4 shows a five-phase generator according to a second exemplary embodiment.
Figure 7:
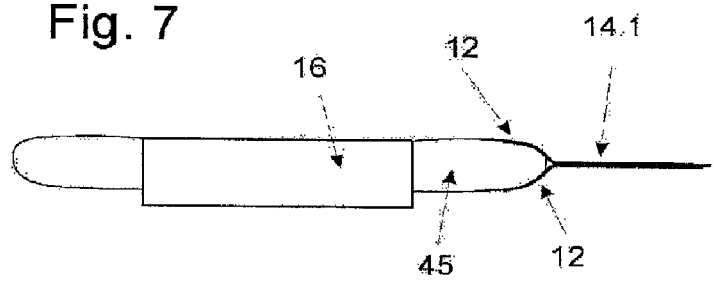
FIG. 7 shows a sectional view through a stator and the winding overhang, including the connection of two phase windings at the winding overhang.

FIG. 4 shows a five-phase generator according to a second exemplary embodiment. The difference from the first exemplary embodiment is that individual phase windings 12 are bridged at two interconnection points 21 within a phase winding 12 (via interconnection points 14.1 through 14.5), and that the center sections of phase windings 21 are connected with each other via these interconnection points 21 in a ring connection. Via two adjacent interconnection points 21, three sub-windings of three different phase windings 12 in a triangle are connected to the pentagon, which is formed of sub-phase windings of all phase windings 12 (FIG. 4).

Connecting leads extend from interconnection points 14.1 through 14.5 to rectifier bridges 18.1 through 18.5. See FIG. 4.

Figure 5:
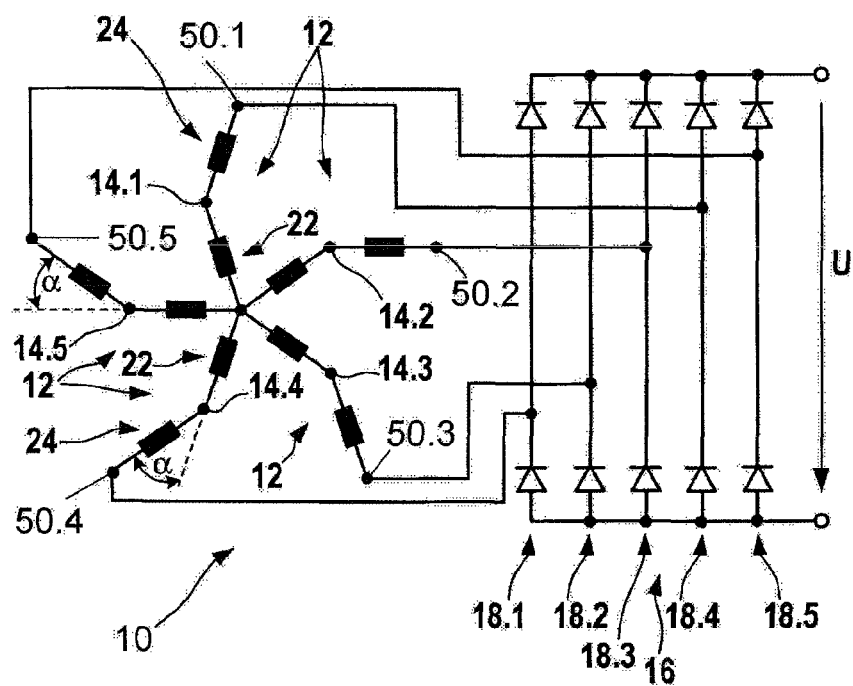
FIG. 5 shows a five-phase generator according to a third exemplary embodiment.

FIG. 5 shows a five-phase generator 1 according to a third exemplary embodiment. Generator 10 is depicted via its circuit diagram in this case as well, and the orientation of the five phase windings 12 located in the slots of a stator 16 with their first and second sub-phase windings 22, 24 represents the electrical angle of sub-phase windings 22, 24 within phase windings 12. Generator 1 is connected to a voltage source U and a (B10) rectifier 16 with five bridge branches 18 (18.1 through 18.5), and is star-connected; a chording was also added. As a result, an electrical angle a results, which is 36° in this case, between a first sub-phase winding 22 and a second sub-phase winding 24 at interconnection points 14. This chording was created by the fact that second sub-phase winding 24 was not inserted using the coil span of five (e.g., from slot 1 to slot 6), which is typically used for a five-phase generator 1, but was inserted in an adjacent slot instead. A generator 1 according to FIG. 5 is particularly quiet-running, and the required windings are easy to manufacture.

Figure 6:
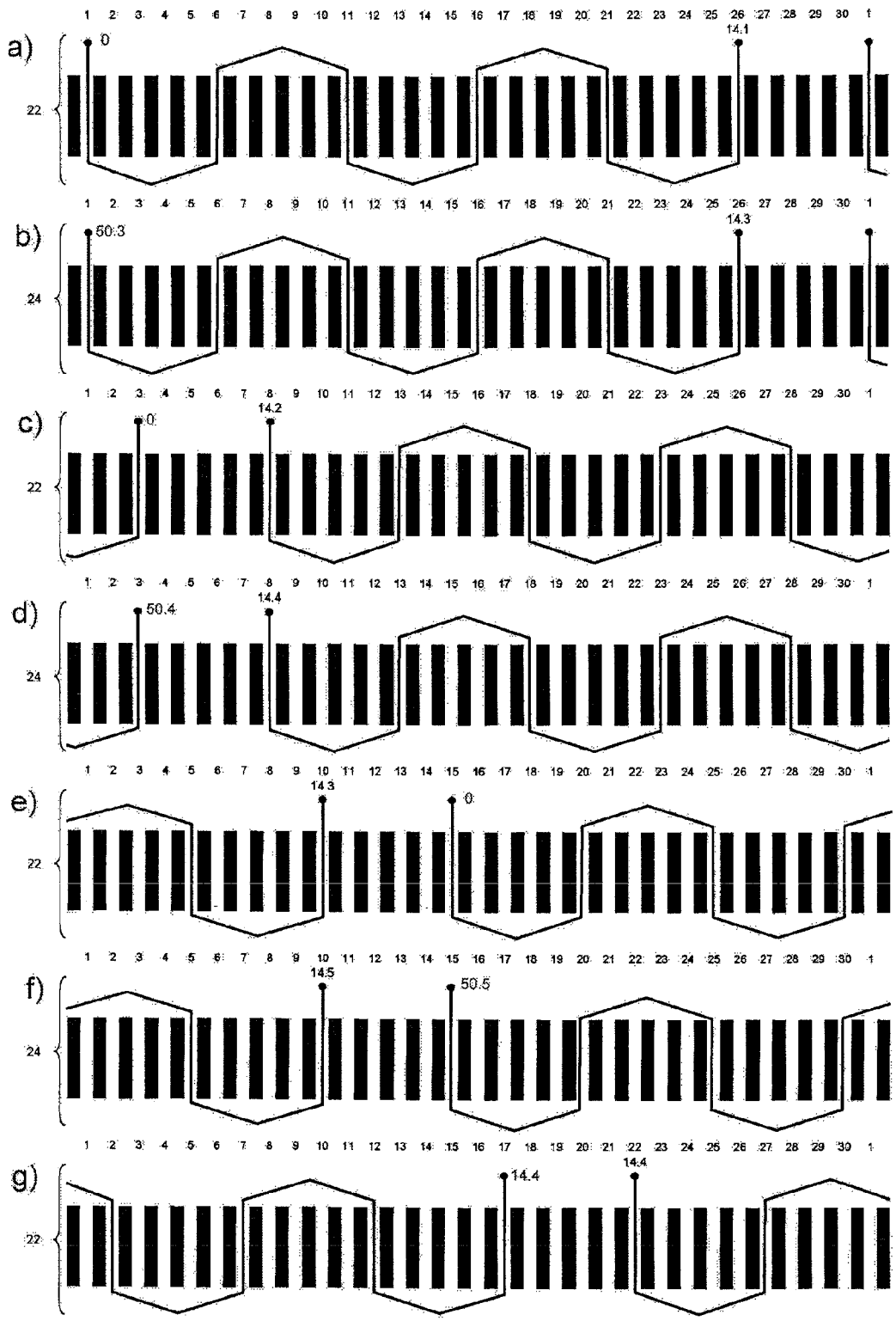
FIG. 6 shows a depiction of the phase wires and their positions in the slots according to the third exemplary embodiment.
Figure 6:
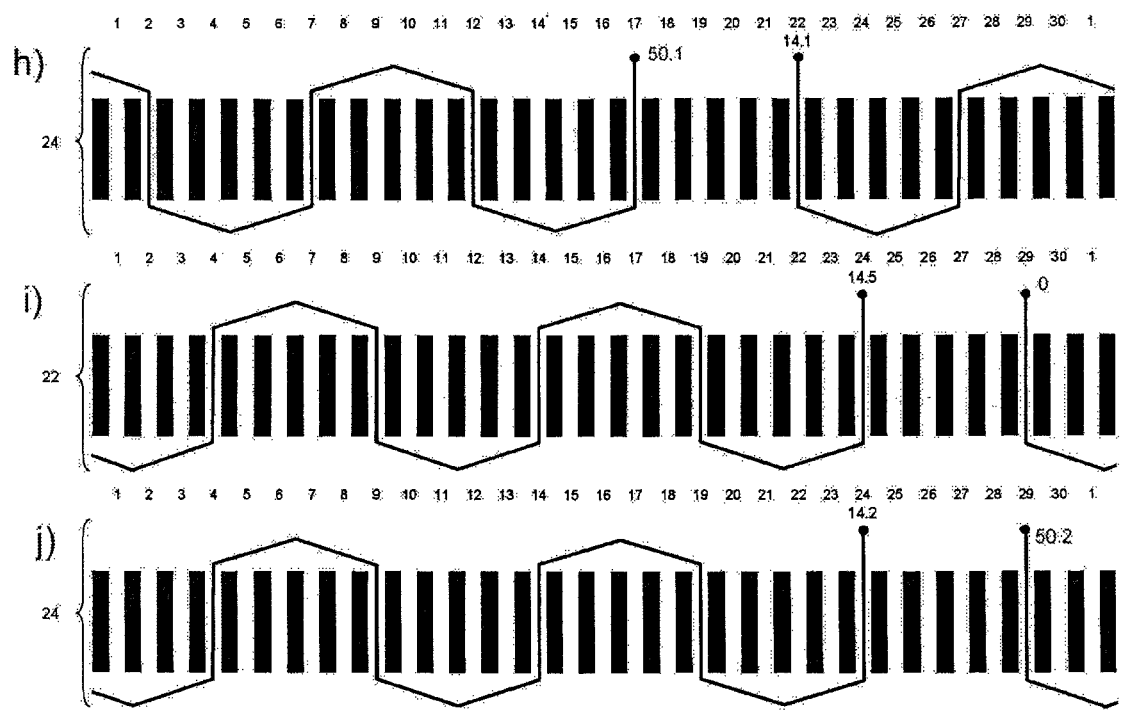

FIG. 6 shows how individual sub-phase windings 22 and 24 are located in stator 16 and its slots. Sub-figures 6a, 6c, 6e, 6g and 6i show the position of sub-phase windings 22. Sub-figures 6b, 6d, 6f, 6h and 6j show the position of sub-phase windings 24. The star point is labelled "0" in FIG. 5.

The five-phase generator shown has a particularly good magnetic noise behavior that is comparable to that of a six-phase generator, although this generator is less expensive to manufacture.

It is provided that the number of slots in stator 16 is a multiple of ten and is preferably a product of the number of pole pairs and ten, and the number of pole pairs is between six and eight.

What is claimed is:

1. A five-phase electrical generator (1), comprising:
    five electrical phase windings (12) for five different phases electrically connected at interconnection points (14);
    a stator (16) composed of a substantially annular stator core (17) and a stator winding (19), wherein the stator core (17) has at least one axially extending slot,
    wherein an electrical angle (a) at the interconnection points (14) is between 25° and 36° and
    wherein an electrically active winding path of a stator winding (19) and, therefore, of the five electrical phase windings (12), is closed after two electrically active convolutions in accordance with linkages of the phase windings (12),
    the generator (1) is connected to a rectifier (16), wherein a stator winding of the generator (1) is composed of one continuous conductor per phase,
    wherein its rotor (20) is a claw-pole rotor, and wherein the number of slots in the stator (16) is a multiple of ten, and the number of pole pairs is between six and eight.

2. A generator (1) as recited in claim 1, wherein the electrical angle (a) is approximately 36°.

3. The generator (1) as recited in claim 1, wherein an interconnection of stator outgoing wires is realized in a winding overhang of the generator (1).

4. The generator (1) as recited in claim 1, wherein the connection of stator outgoing wires is positioned within a wiring plate that is assigned to a rectifier (16).

5. The generator (1) as recited in claim 1, wherein a copper factor of a stator of the generator is greater than or equal to 50%.

6. The generator (1) as recited in claim 1, wherein, for a voltage level of 14V, five to eleven electrical are inserted into each slot of a stator of the generator (1).

7. A five-phase electrical generator (1), comprising:
    five electrical phase windings (12) for five different phases electrically connected at interconnection points (14);
    a stator (16) composed of a substantially annular stator core (17) and a stator winding (19), wherein the stator core (17) has at least one axially extending slot,
    wherein an electrical angle (a) at the interconnection points (14) is between 25° and 36° and
    wherein an electrically active winding path of a stator winding (19) and, therefore, of the five electrical phase windings (12), is closed after two electrically active convolutions in accordance with linkages of the phase windings (12),
    the generator (1) is connected to a rectifier (16), wherein a stator winding of the generator (1) is composed of one continuous conductor per phase,
    wherein its rotor (20) is a claw-pole rotor, wherein the number of slots in the stator (16) is a multiple of ten, and the number of pole pairs is between six and eight, and wherein, for a voltage level of 14V, five to eleven electrical conductors are inserted into each slot of a stator of the generator (1).

8. The generator (1) as recited in claim 7, wherein, in one configuration of the generator (1) for a voltage level of 42V, 19 to 30 electrical conductors are inserted into each slot of a stator of the generator (1).

9. The generator (1) as recited in claim 1, wherein a stator winding of the generator (1) includes a chording.

10. The generator (1) as recited in claim 9, wherein each of the phase windings (12) of the generator (1) includes at least two sub-phase windings (22, 24), which are connected with each other at the interconnection points (14), and the sub-phase windings (22, 24) are wound individually and are interconnected in a winding overhang or on a wiring plate.

11. The generator (1) as recited in claim 1, wherein one half of each phase winding (12) is inserted into one of two adjacent slots of a stator of generator (1).

12. The generator (1) as recited in claim 1, wherein a total interconnection of the generator (1) is a star pattern.

13. The generator (1) as recited in claim 1, wherein, for a voltage level of 14V, two to five electrical conductors are inserted into each slot of a stator (16) of the generator (1).

14. The generator as recited in claim 1, wherein, in one configuration of the generator (1), for a voltage level of 28V, five to nine electrical conductors are inserted into each slot of a stator of the generator (1).

15. The generator (1) as recited in claim 1, wherein, in one configuration of the generator (1), for a voltage level of 42V, ten to 15 electrical conductors are inserted into each slot of a stator of the generator (1).

16. The generator as recited in claim 1, wherein the windings overhangs (45) are cooled by a radial cooling air flow.

17. The generator as recited in claim 7, wherein, in one configuration of the generator (1) for a voltage level of 28V, ten to 18 electrical conductors are inserted into each slot of a stator of the generator (1).

18. The generator as recited in claim 7, wherein eight electrical conductors are inserted into each slot.

19. The generator (1) as recited in claim 7, wherein a copper factor of a stator of the generator is greater than or equal to 50%, wherein the copper factor is the ratio of the sum of all copper cross sections of the conductors located in a slot to the total cross section of the slot.

20. A five-phase electrical generator (1), comprising:
 five electrical phase windings (12) for five different phases electrically connected at interconnection points (14);
 a stator (16) composed of a substantially annular stator core (17) and a stator winding (19), wherein the stator core (17) has at least one axially extending slot,
 wherein an electrical angle (a) at the interconnection points (14) is between 25° and 36° and
 wherein an electrically active winding path of a stator winding (19) and, therefore, of the five electrical phase windings (12), is closed after two electrically active convolutions in accordance with linkages of the phase windings (12),
 wherein the generator (1) is connected to a rectifier (16), wherein a stator winding of the generator (1) is composed of one continuous conductor per phase, and wherein, for a voltage level of 14V, two to five electrical are inserted into each slot of a stator (16) of the generator (1), wherein its rotor (20) is a claw-pole rotor, and wherein the number of slots in the stator (16) is a multiple of ten and the number of pole pairs is between six and eight.

21. The generator as recited in claim 20, wherein eight electrical conductors are inserted into each slot.

22. A generator (1) as recited in claim 20, wherein the electrical angle (a) is approximately 36°.

23. The generator (1) as recited in claim 20, wherein an interconnection of stator outgoing wires is realized in a winding overhang of the generator (1).

24. The generator (1) as recited in claim 20, wherein the connection of stator outgoing wires is realized within a wiring plate that is assigned to a rectifier (16).

25. The generator (1) as recited in claim 20, wherein a copper factor of a stator of the generator is greater than or equal to 50%, wherein the copper factor is the ratio of the sum of all copper cross sections of the conductors located in a slot to the total cross section of the slot.

26. A generator (1) as recited in claim 7, wherein the electrical angle (a) is approximately 36°.

27. The generator (1) as recited in claim 7, wherein an interconnection of stator outgoing wires is realized in a winding overhang of the generator (1).

28. The generator (1) as recited in claim 7, wherein the connection of stator outgoing wires is positioned within a wiring plate that is assigned to a rectifier (16).

29. The generator (1) as recited in claim 7, wherein a copper factor of a stator of the generator is greater than or equal to 50%.

30. A generator (1) as recited in claim 1, wherein the number of slots is a product of the number of pole pairs and 10.

31. A generator (1) as recited in claim 7, the number of slots is a product of the number of pole pairs and 10.

32. A generator as recited in claim 20, the number of slots is a product of the number of pole pairs and 10.

* * * * *